United States Patent [19]

Upchurch

[11] Patent Number: 5,700,024
[45] Date of Patent: Dec. 23, 1997

[54] COUPLER LOCKING DEVICE AND METHOD

[76] Inventor: James W. Upchurch, 26 Harbour La., Ringgold, Ga. 30736

[21] Appl. No.: 532,085

[22] Filed: Sep. 22, 1995

[51] Int. Cl.⁶ .................................................. B60D 1/60
[52] U.S. Cl. ........................................................ 280/507
[58] Field of Search ............................. 280/507, 504, 280/511, 512; 70/14, 58

[56] References Cited

U.S. PATENT DOCUMENTS

| | | | |
|---|---|---|---|
| 3,884,055 | 5/1975 | Vuillemot | 280/507 X |
| 4,208,065 | 6/1980 | Hansen | 280/507 |
| 4,459,832 | 7/1984 | Avrea et al. | 280/507 X |
| 4,538,827 | 9/1985 | Plifka | 280/507 |
| 4,577,884 | 3/1986 | Harris | 280/507 |
| 4,836,570 | 6/1989 | Lopez et al. | 280/507 |
| 5,154,440 | 10/1992 | Dolan et al. | 280/507 |
| 5,222,755 | 6/1993 | O'Neal | 280/507 |
| 5,280,941 | 1/1994 | Guhlin | 280/507 |
| 5,322,316 | 6/1994 | Wheeler | 280/507 |
| 5,378,008 | 1/1995 | McCrossen | 280/507 |
| 5,395,131 | 3/1995 | Herrick | 280/507 |
| 5,433,467 | 7/1995 | Easterwood | 280/507 |
| 5,433,468 | 7/1995 | Dixon | 280/507 |
| 5,476,281 | 12/1995 | Worthington | 280/507 |
| 5,584,495 | 12/1996 | Mason | 280/507 |

FOREIGN PATENT DOCUMENTS 992133  5/1965  United Kingdom .................. 280/507

*Primary Examiner*—Kevin Hurley
*Attorney, Agent, or Firm*—Miller & Martin

[57] ABSTRACT

A coupler locking device which can be affixed to the coupler mechanism of a trailer thereby preventing the accidental or unauthorized uncoupling of the coupler mechanism and which is useful both when the trailer is coupled to a towing vehicle and when the trailer is not coupled to a towing vehicle. Essentially the coupler locking device comprises a bracket which, when properly engaged with a joining member by a locking device, prevents separation of the hitch ball and the socket of the coupler mechanism as well as removal of the hitch ball from the towing vehicle, when so affixed. The method of using a coupler locking device having a bracket, joining member and a locking device.

14 Claims, 4 Drawing Sheets

COUPLER LOCKING DEVICE AND METHOD

BACKGROUND OF THE INVENTION

The present invention relates generally to trailers attached to pulling vehicles and particularly to an anti-theft and safety coupler locking device and method useful both when the trailer is coupled to a towing vehicle and when the trailer is not coupled to a towing vehicle.

SUMMARY OF THE INVENTION

The present invention, which will be described subsequently in greater detail, comprises an anti-theft and safety coupler locking device and method for use in conjunction with a standard coupler mechanism or trailer hitch.

By their very nature, trailers typically carry articles and equipment of great value and are, therefore, a lucrative target for theft. While being towed, trailers coupled with towing vehicles are often parked unattended for long periods of time. While the towing vehicles themselves are routinely protected with any number of anti-theft devices, the coupler mechanism between the vehicle and trailer is rarely protected. It is a simple matter for thieves to uncouple the trailer from the towing vehicle and attach it to a towing vehicle under their control. Similarly, uncoupled trailers are even more easily stolen, the thieves merely needing a vehicle capable of pulling the trailer and an appropriately sized hitch ball.

A trailer hitch is the most common coupler mechanism used to secure a trailer to a pulling vehicle, such as an automobile or truck. Typically, such a coupler mechanism comprises a ball and socket arrangement in conjunction with a retaining mechanism which functions to secure the hitch ball within the socket when the coupler mechanism is in the coupled or hitched position. The retaining mechanism is commonly a user manipulated retaining latch or handwheel which, when properly engaged, secures the ball within the socket through the application of a retaining force.

A safety concern associated with the towing of a trailer is that a rough jolt or bump may provide sufficient force to overcome the retaining force of the retaining mechanism, causing the trailer to uncouple from the towing vehicle while in motion. Many retaining mechanisms are equipped with a retaining tab which engages a recess in the hitch. Such retaining tabs are somewhat effective in preventing the accidental detachment of the coupler during towing, but are ineffective against unauthorized removal by thieves. Many retaining mechanisms are also designed so that a universal locking device such as a padlock can be used in order to keep the latch from being manipulated. However, even with a lock in place, it is a common practice for thieves to remove the hitch socket from the ball by using a lever to force or "pop" the socket off the ball.

Since trailer hitches and hitch balls come in different sizes, a ball is typically releasably bolted to the towing platform of a towing vehicle so that differently sized balls may be readily interchanged. When the coupler mechanism is locked to the ball, a thief may also acquire the trailer by unbolting the ball from the towing vehicle and reattaching it to a towing vehicle under his control.

Similarly, the towing platforms of certain vehicles vary in shape and design. The most common towing platform, herein referred to as an arm-type towing platform, is comprised of a relatively thin, reinforced metal bar which protrudes from the rear of a towing vehicle and has a centrally located shaft hole sized to receive a variety of stud-type hitch balls. Relatively recently, a newer, bumper-type towing platform has appeared in the marketplace. As the name implies, a bumper-type towing platform incorporates the towing platform and shaft hole into the design of the rear bumper of the towing vehicle. Such a design is common on light trucks, such as pick-up trucks, and commonly comprises a reinforced, flattened portion of the bumper having a centrally located shaft hole. Manufacturers of bumper-type towing platforms also commonly incorporate into the design of such bumper-type towing platforms one or more flanking holes on either side of the shaft hole. Such flanking holes may be sized to receive and store additional stud-type hitch balls not currently in use.

There are several trailer hitch locking devices known in the art, as well as devices used to secure hitch balls to towing platforms. However, few, if any, of these devices have useful security applications both while the trailer is coupled to a towing vehicle and while the trailer is uncoupled. Similarly, few if any of these prior art locking devices are designed for use in conjunction with a bumper-type towing platform.

Therefore, it is an object of the present invention to provide a coupler locking device that prevents the accidental or unauthorized uncoupling of a trailer from its coupled or hitched position.

It is also an object of the present invention to provide a coupler locking device that prevents unauthorized coupling to an uncoupled trailer.

It is a further object of the present invention to provide a coupler locking device that prevents the unauthorized removal of a hitch ball from the towing platform of a towing vehicle while a trailer is coupled thereto.

It is also an object of the present invention to provide a coupler locking device that can be used in conjunction with arm-type towing platforms.

It is another object of the present invention to provide a coupler locking device that can be used in conjunction with bumper-type towing platforms.

It is yet another object of the present invention to provide a method of locking the ball component of a ball-and-socket coupler mechanism within the socket, whether or not the ball is attached to the towing platform of a towing vehicle.

It is a further object of the present invention to provide a coupler locking device that is inexpensive to manufacture and easily and inexpensively installed by most owners of trailers.

Other objects, advantages and applications of the present invention will become apparent to those skilled in the art when the accompanying description of the preferred embodiments of the present invention is read in conjunction with the accompanying drawings.

DETAILED DESCRIPTION OF THE DRAWINGS

Figure 1:
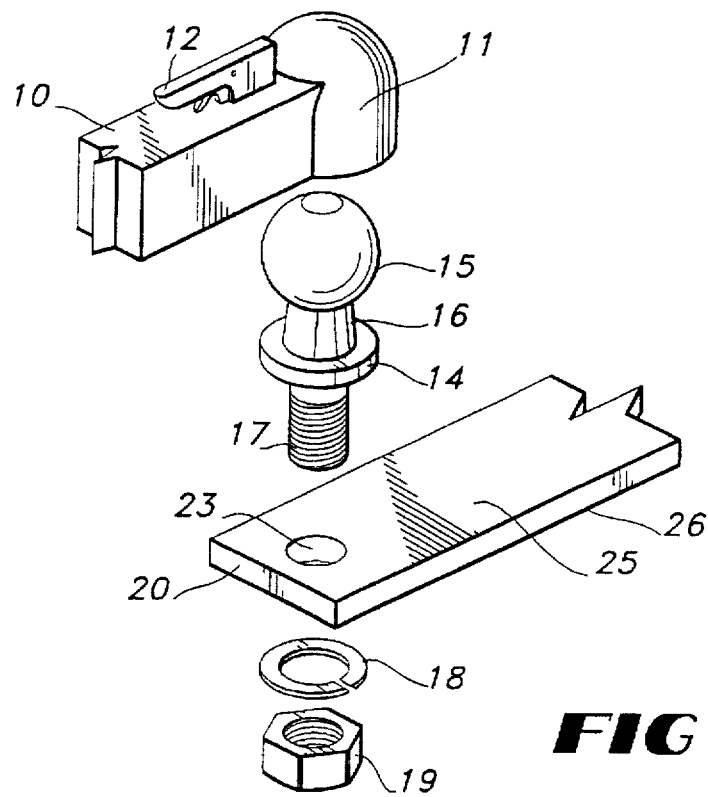
FIG. 1 is an exploded view of a typical coupler mechanism or trailer hitch.

Referring now to the drawings and in particular to FIG. 1, an exploded view of a typical coupler mechanism or trailer hitch 10 is shown. The coupler mechanism 10 comprises a socket 11 which will hold an appropriately sized stud-type hitch ball 15. The ball 15 is secured in the socket 11 by a retaining mechanism or retaining latch 12 which applies a retaining force to the ball 15 when correctly engaged. The ball 15 has a post 16 with an outwardly extending flange 14 and a threaded shaft 17. The flange 14 engages against the top surface 25 of the towing platform 20 of a towing vehicle (not shown) when the threaded shaft 17 is inserted through a shaft hole 23 centrally located in the towing platform 20.

The ball 15 is releasably affixed to the towing platform 20 by tightening an optional washer or lock washer 18 and threaded nut 19 onto the threaded shaft 17 until the bottom surface 26 of the towing platform 20 is securely engaged.

Figure 7:
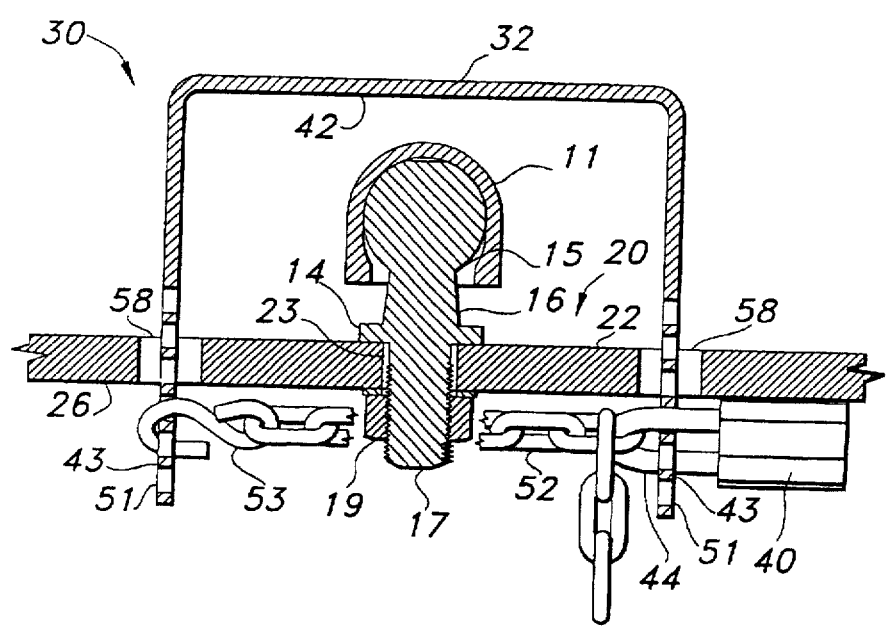
FIG. 7 is a rear cross-sectional view of the coupler locking device of FIG. 6, shown in the locking position.

A towing platform 20 may be a conventional arm-type platform 21 (shown in FIG. 3) or a bumper-type platform 22 (shown in FIG. 7).

Figure 3:
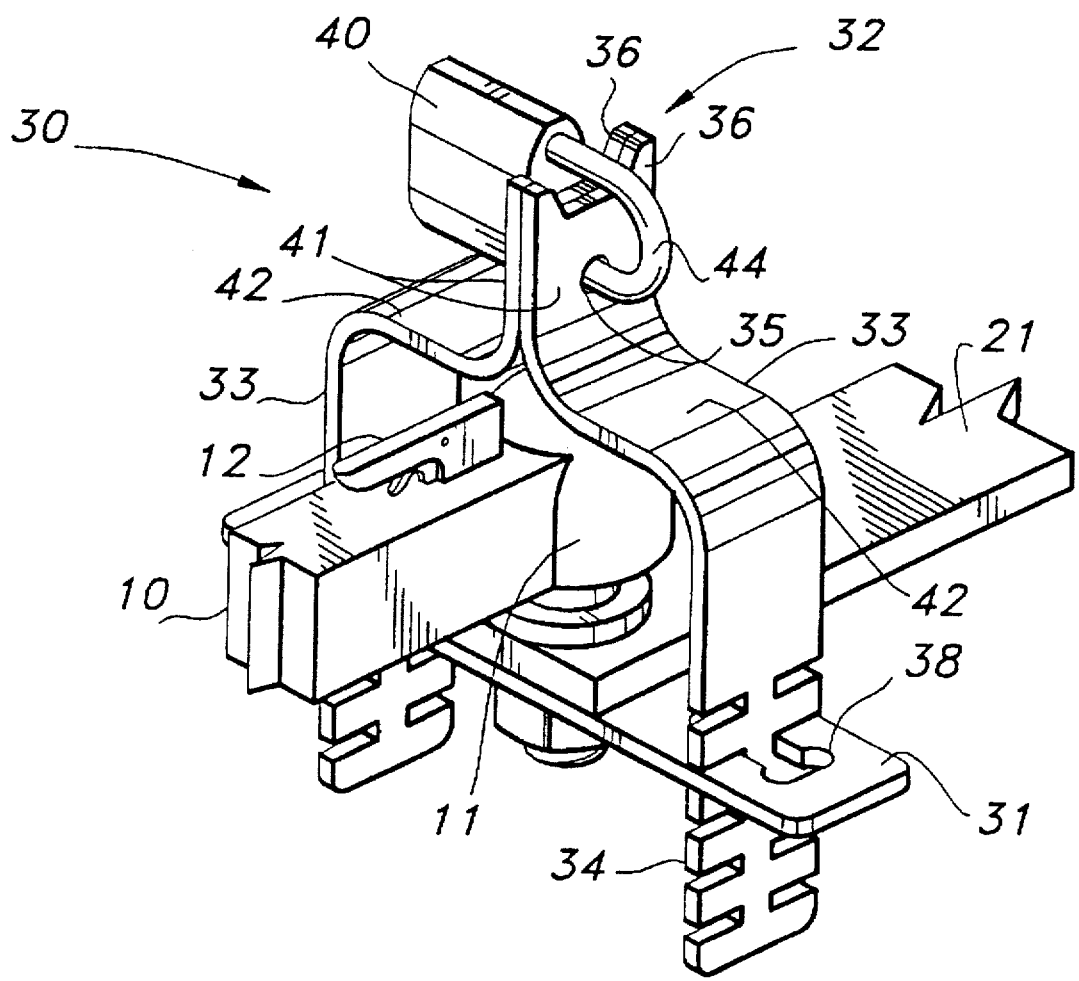
FIG. 3 is a perspective view of the coupler locking device of FIG. 2, shown in the locking position.
Figure 6:
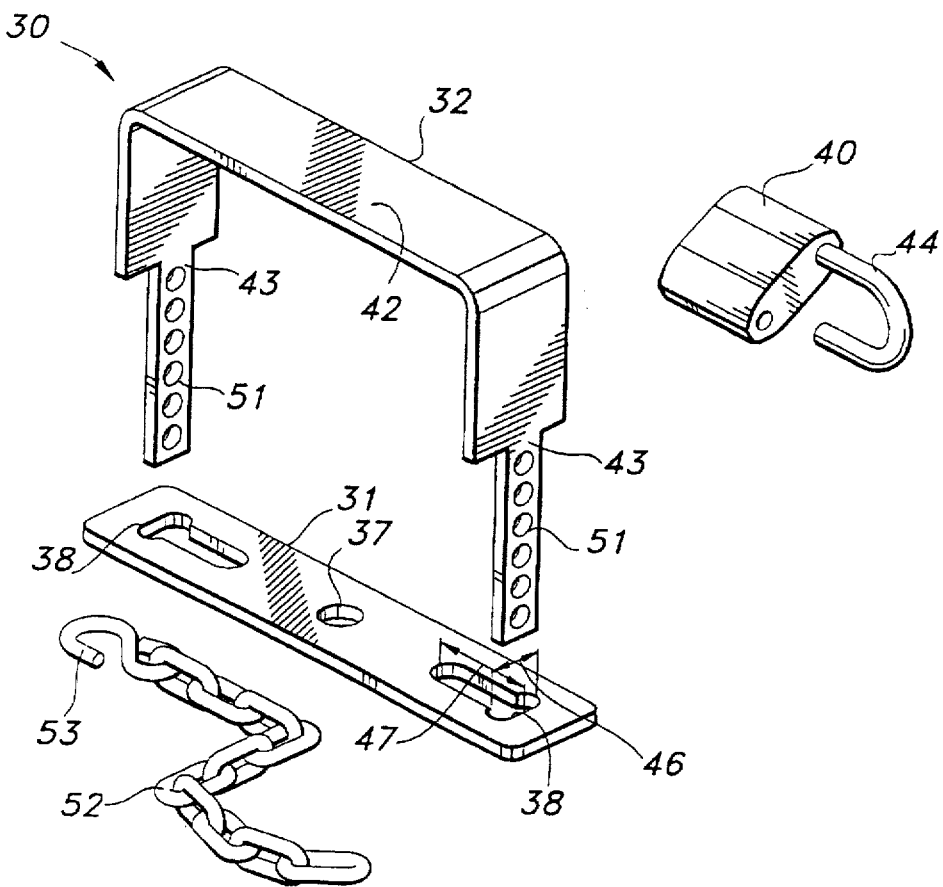
FIG. 6 is a perspective view of another preferred embodiment of the coupler locking device constructed specifically for bumper-type towing platforms.

Referring momentarily to FIGS. 3 and 6, the coupler locking device 30 of the present invention essentially comprises a bracket member 32 which, when properly engaged with a joining member (such as plate 31 or chain 52) by a locking device 40 (or by a locking device 40 and a hooking device 53), prevents the socket 11 of a coupler mechanism 10 from being disengaged from a stud-type ball 15, whether the ball 15 is affixed to the towing platform 20 of a towing vehicle (not shown) or not. Additionally, when the ball 15 is affixed to the towing platform 20 of a towing vehicle (not shown), the coupler locking device 30 prevents removal of the ball 15 from the towing platform 20.

The coupler locking method of the present invention comprises essentially the steps of coupling the hitch ball 15 and socket 11 of a coupling mechanism 10, whether or not attached to a towing platform 20; surrounding the coupler mechanism 10 with a bracket member 32 and a joining member such that the hitch ball 15 may not be removed from the socket 11 of the coupler mechanism 10, and locking the bracket member 32 and joining member in place using a locking device 40. If the ball 15 is attached to the towing platform 20, then the bracket member 32 and joining member also surround at least a portion of the towing platform 20 (as shown in FIGS. 3 (No. 21) and 7 (No. 22)).

Figure 2:
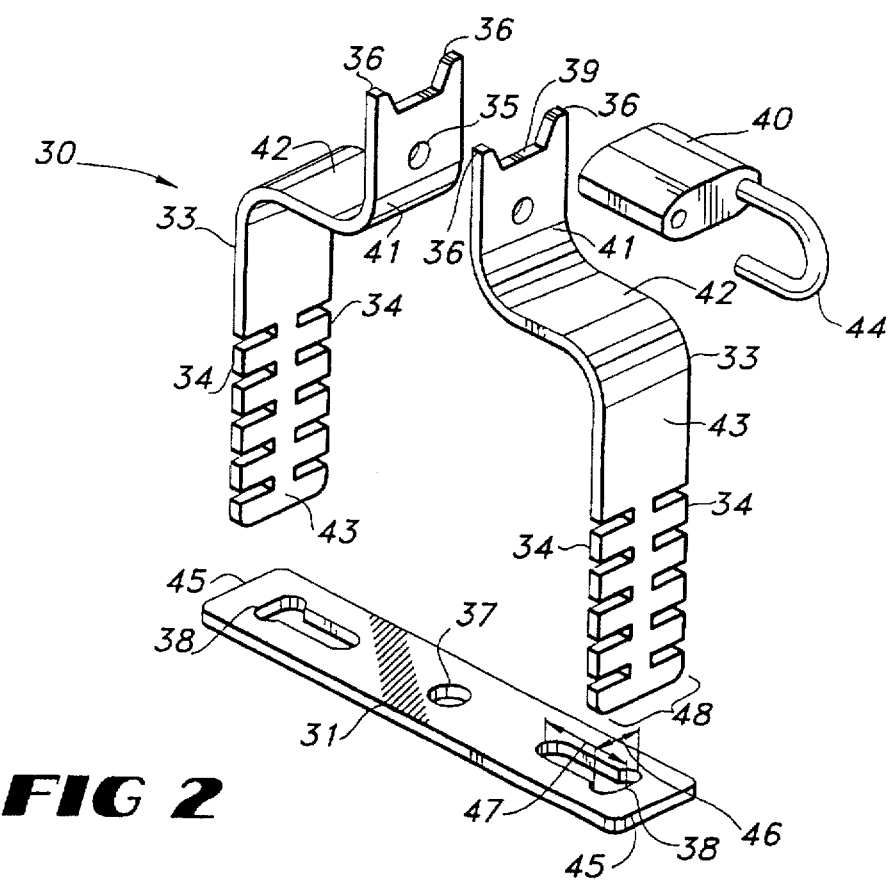
FIG. 2 is a perspective view of one preferred embodiment of the coupler locking device constructed specifically for use with a conventional, arm-type towing platform.
Figure 4:
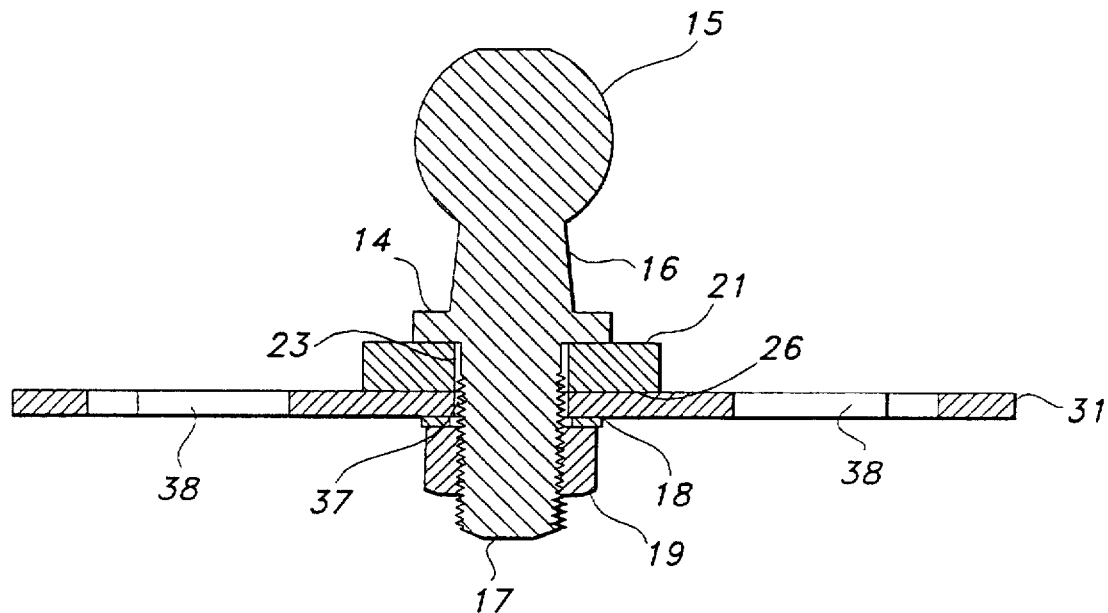
FIG. 4 is a rear cross-sectional view of a stud-type hitch ball and arm-type towing platform illustrating the attachment of the plate member of the coupler locking device of FIGS. 2 and 3.

FIG. 2, then, is a perspective view of one preferred embodiment of the coupler locking device 30 constructed specifically for use with a conventional, arm-type towing platform 21 (shown in FIGS. 3 and 4). In this preferred embodiment, the bracket member 32 (not shown in FIG. 2) is comprised of two identical bracket arms 33 properly engaged in the locking position (as shown in FIG. 3). Each bracket arm 33 is constructed of a single, flat bar of metal or a similar rigid material, having a proximate mating section 41, a medial guarding section 42 and a distal fastening section 43.

Centrally located on the proximate mating section 41 is a lock hole 35 which may be sized to receive a universal locking device 40 such as the hinged link 44 of a typical padlock. Retaining pegs 36 located on either side of the free end of the proximate mating section 41 form a link notch 39 over which the hinged link 44 of the padlock 40 may be passed (as shown in FIG. 3).

A plurality of symmetrically opposing teeth 34 are located on each edge of the distal fastening section 43 of each bracket arm 33. Said teeth 34 are spaced so as to snugly accommodate a joining member, such as plate 31 (described below) when the bracket arm is rotated into locking position (as shown in FIG. 3 and as further described below).

The coupler locking device 30 further comprises a joining member, such as plate 31, capable of releasably connecting the distal fastening sections 43 of the bracket arms 33. In this preferred embodiment, the joining member comprises a rectangular plate 31 constructed of a single, flat bar of metal or a similar rigid material, having a centrally located plate shaft hole 37 which may be sized to receive the threaded shaft 17 (not shown) of typical, stud-type hitch balls 15 (as shown in FIG. 4). It is through this plate shaft hole 37 that this preferred embodiment of the coupler locking device 30 is affixed to the coupler mechanism 10 (not shown).

The plate 31 also has two, symmetrical plate armholes 38 located at the distal ends 45 of the plate 31. Each plate arm hole 38 is generally T-shaped, comprising a peripheral slot 46 oriented parallel to the distal end 45 of the plate 31, and a longitudinal slot 47 oriented perpendicularly to the distal end 45 of the plate 31. In this preferred embodiment, the width of each longitudinal slot 47 is sufficient to allow the longer width 48 of the bracket arm 33 to be inserted therein when the bracket arm 33 is rotated ninety degrees relative to the locking position. No aspect of a plate armhole 38, including the peripheral slot 46, is large enough to receive the longer width 48 of the bracket arm 33 when positioned in the locking position (as shown in FIG. 3). Thus, it can be seen that the locking position is only attainable when the bracket arm 33 is partially inserted through the longitudinal slot 47 of the plate arm hole 38 and then rotated ninety degrees such that the plate 31 is positioned in the open spaces between any pair of teeth 34 (as shown in FIG. 3).

As shown in FIGS. 2 and 6, in both preferred embodiments of the present invention, each plate armhole 38 also comprises a peripheral slot 46 forming that part of the plate armhole 38 most proximate to the distal end of the plate 31. As will be described in greater detail with regard to FIG. 6, this peripheral slot 46 of the plate arm holes 38 allows the plate 31 to be used interchangeably between the different preferred embodiments of the present invention, thereby reducing production costs.

Turning then to FIG. 3, a perspective view of the coupler locking device 30 of FIG. 2 is shown in the locking position. In FIG. 3, a coupler mechanism 10 is "hitched" or engaged, meaning that its socket 11 encompasses a ball 15 (not shown) affixed to an arm-type towing platform 21. The bracket member 32 is formed by the union of the proximate mating sections 41 of the bracket arms 33 by means of a universal locking device, such as padlock 40. The plate 31 is secured to the coupler mechanism 10 and the bottom surface 26 of the towing platform 21 as more fully described below in regard to FIG. 4. The locking position is accomplished by inserting a bracket arm 33 through the longitudinal slot 47 of each plate arm hole 38 of the plate 31 and rotating each bracket arm 33 inwardly such that the medial guarding sections 42 of each bracket arm 33 are positioned at a height approximately one-half inch above the socket 11 of the coupler mechanism 10. The height of the medial guarding sections 42 over the socket is 11 is determined by the placement of the plate 31 between the teeth 34 on the distal fastening section of the bracket arm 33. If the plate 31 is placed between teeth relatively high on the distal fastening section 43 of the bracket arm 33, the medial guarding sections 42 will be nearer to the socket 11 than if the plate 31 is placed between teeth 34 nearer to the bottom of the distal fastening section 43 of the bracket arm 33.

The inward rotation of the bracket arms 33 causes the proximate mating sections 41 of each bracket arm 33 to align. The proximate mating sections 41 are then brought into the locking position by moving the bracket arms 33 inward or outward along the length of the plate armholes 38 as appropriate. The bracket member 32 is then formed by joining the proximate mating sections 41 with a locking device, such as by inserting the hinged link 44 of a padlock 40 through the aligned lock holes of each bracket arm 33. Thus it can be seen that when the bracket member 32 is formed, the socket 11 cannot be removed from the ball 15, whether intentionally or accidentally, unless the integrity of the bracket member 32 is compromised in some fashion, nor can the ball 15 be removed from the towing platform 21. The locking of the bracket arms 33 locks the joining member to the distal fastening sections 43 of each bracket arm 33 because the bracket arms 33 cannot rotate to be pulled through the longitudinal slots 47 of the bracket armholes 38 of the plate 31 while in the locked position. When the hinged link 44 of the padlock 40 is passed through the link notch 39, the link notch 39 and retaining pegs 36 serve to keep the padlock 40 from rotating to the sides of the bracket arms 33. Restricting such rotation serves to enhance the effectiveness of the coupler locking device 30 by preventing the possibility that the bracket arms 33 may be rotated out of the locking position and removed from the plate 31 while locked. The link notch 39 and retaining pegs 36 also serve to restrict access to the hinged link 44 when locked through the lock holes 35, such as with a bolt cutter (not shown).

FIG. 4 is a rear cross-sectional view of a stud-type hitch ball 15 and arm-type towing platform 21 illustrating how the plate 31 of the coupler locking device 30 of FIGS. 2 and 3 is affixed thereto. The plate shaft hole 37 of the plate 31 is simply inserted onto the threaded shaft 17 of the ball 15 between the lock washer 18 and towing platform 21, and affixed thereto with an appropriately tightened nut 19. Before tightening the nut 19, the plate 31 is oriented such that the plate arm holes 38 are positioned parallel to the axles (not shown) of the towing vehicle (not shown). Such orientation allows the greatest freedom for the coupler mechanism 10 to swivel about the ball 15 as turns are made by the towing vehicle (not shown).

Thus, from FIGS. 3 and 4, it can be seen that once the bracket member 32 is formed by the union of the bracket arms 33 in the locking position, even if a would-be thief removes the nut 19 from the threaded shaft 17 of the stud-type hitch ball 15, the ball 15 will be kept locked within the socket 11 of the coupler mechanism 10 and attached to the towing platform 21 by the coupler locking device 30. The threaded shaft 17 cannot be removed from the plate 31 or the towing platform 21 while the bracket member 32 (shown in FIG. 3) keeps the socket 11 from being removed from the ball 15. As shown in FIGS. 3 and 7, the union of the bracket member 32 and the joining member 31 surrounds not only the ball 15 within the socket, but also at least a portion of the towing platform 21 (FIG. 3) or 22 (FIG. 7).

Figure 5:
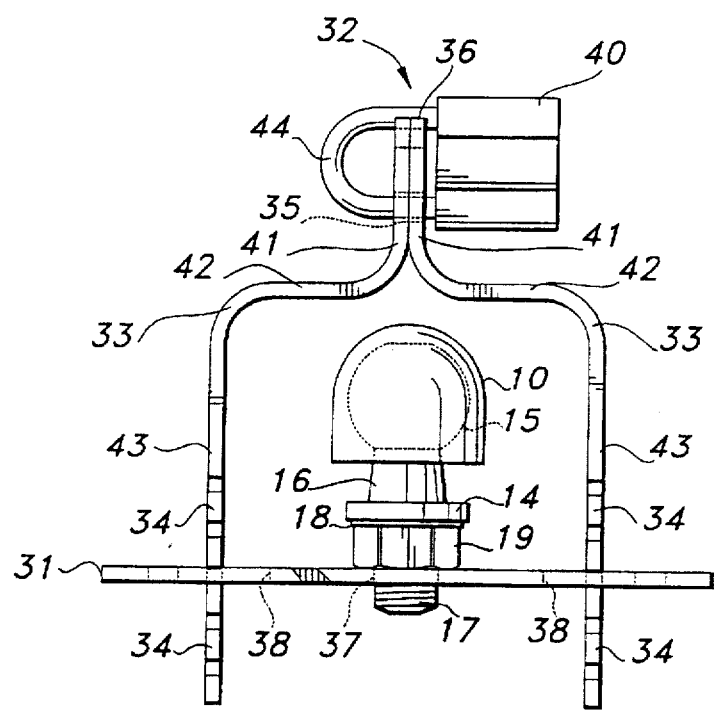
FIG. 5 is a front view of the coupler locking device of FIG. 2, shown in the locking position on an unhitched coupling mechanism.

This embodiment of the present invention likewise provides effective anti-theft protection when the coupler mechanism 10 is not coupled or hitched to the towing platform 21 of a towing vehicle (not shown). FIG. 5 is a front view of the coupler locking device 30 of FIG. 2, shown in the locking position on a coupling mechanism which is not connected to a towing platform 21 (not shown). The ball 5 is removed from the towing platform 21 (not shown) and inserted into the socket 11 of the coupler mechanism 10. The lock washer 18 and nut 19 are then tightened onto the threaded shaft 17 so that the lock washer rests against the flange 14. The shaft 17 is then inserted through the plate 31 via the plate shaft hole 37. The bracket member 32 is then formed by inserting the bracket arms 33 through the bracket arm holes 38 and rotating them into the locking position such that the medial guarding sections 42 rest against the top of the socket 11. The bracket arms 33 are then locked into position with a padlock 40.

When the coupler locking device 30 is used on an unhitched coupling mechanism 10, it is important that less than one-half inch of the shaft 17 protrude below the plate 31 so that the ball 15 cannot be attached to a towing platform 20 while locked. If necessary, additional nuts 19 (not shown) may be added as spacers prior to the attachment of the plate 31 in order to reduce the amount of shaft 17 left protruding below the plate 31 when in the locked position.

FIG. 6 shows a perspective view of another preferred embodiment of the coupler locking device 30 of the present invention constructed specifically for bumper-type towing platforms 22 (not shown). As seen in FIG. 6, the bracket member 32 of this embodiment of the coupler locking device 30 is comprised of a single bar of metal or a similar rigid material, having a medial guarding section 42 and a distal fastening section 43 at either end. Each distal fastening section 43 may have any appropriate width to suit the flanking bumper holes 58 (shown in FIG. 7) typically found on a bumper-type towing platform 22 (also shown in FIG. 7). Flanking bumper holes 58 may also be drilled through a bumper-type towing platform 22 if not so equipped by the manufacturer. Similarly, the medial guarding section 42 of the bracket member 32 may have any appropriate length to suit the distance between the flanking bumper holes 58 (shown in FIG. 7) of a bumper-type towing platform 22 (also shown in FIG. 7).

In this preferred embodiment, each fastener section 43 has a plurality of evenly spaced latching holes 51 which may be sized to receive the hinged link 44 of a universal locking device such as a typical padlock 40.

This preferred embodiment of the coupler locking device 30 further comprises at least one joining member, such as chain 52, capable of being joined to both distal fastening sections 43 by a plurality of locking devices such as padlock 40. It is preferable, however, to use a hooking device, such as S-hook 53, to join the chain 52 to one distal fastening section 43 while using a padlock 40 to connect the chain 52 to the other distal fastening section 43 (as shown in FIGS. 6 and 7). This avoids the additional expense of procuring two padlocks, though two padlocks may be used for an additional measure of protection.

Finally, this preferred embodiment of the present invention constructed specifically for bumper-type towing platforms 22 (not shown in FIG. 6), further comprises a second joining member in the form of a plate 31 identical to that described in reference to FIG. 2 above, though, as described in more detail below, this plate 31 is essential only for use of the coupler locking device 30 in conjunction with an unhitched coupler mechanism 10 (not shown). The peripheral slot 46 of each plate arm hole 38 is sized to receive the distal fastening sections 43 of the bracket member 32. As shown in FIGS. 2 and 6, in the preferred embodiment of the present invention, only the peripheral slot 46 is wide enough to receive the distal fastening sections 43 of the bracket member 32 of this second embodiment when in the locking position. This posterior widening of the plate arm holes 38 allows the distal fastening sections 43 to be inserted through the peripheral slots 46 of the plate arm holes 38, yet keeps the distal fastening sections 43 from sliding laterally throughout the entire length of the longitudinal slots 47 of the plate armhole 38. As mentioned above, this posterior widening of the plate arm holes 38 allows the plate 31 to be used interchangeably between the different preferred embodiments of the present invention, thereby reducing production costs.

FIG. 7 is a rear cross-sectional view of the coupler locking device of FIG. 6, shown in the locking position. The locking position is achieved by first coupling the socket 11 of the coupler mechanism (not shown) to the ball 15 which is, in turn, affixed to the bumper-type towing platform 22 by lock washer 14 and nut 19. The distal fastening sections 43 of the bracket member 32 are then lowered through the flanking bumper holes 58 until the medial guarding section 42 of the bracket member 32 is approximately one-half inch above the top of the socket 11. The joining member or chain 52 is then connected to one distal fastening section 43 by a hooking device, such as S-hook 53, and then to the other distal fastening section 43 by a locking device, such as padlock 40. Alternately, two padlocks 40 (not shown) can be used to join each end of the chain to the opposing distal fastening sections 43. In order to reduce the vertical play in the coupler locking device 30 and to provide the most effective theft deterrent and safety protection, it is necessary that the chain 52 and distal fastening sections 43 be joined by passing the S-hook 53 and padlock 40 through the latching hole 51 closest to the bottom surface 26 of the towing platform 22. To further reduce play and increase deterrence, the chain should be stretched as tightly as possible between the distal fastening sections 43 when attached. Finally, in order to reduce the chance that the S-hook can be unhooked from the latching hole 51, the S-hook 53 should be threaded through the appropriate latching hole 51 from the inner side (i.e., the side of the distal fastening section 43 nearest to the ball 15) rather than from the outer side.

Thus, in FIG. 7, it can be seen that once the locking position has been achieved by the attachment of the joining member 52 to the distal fastening sections 43 of the bracket member 32, the socket of the coupler mechanism (not shown) is held on the ball 15 by the bracket member 32 because the chain 52, hooking device 53 and padlock 40 prevent the distal fastening sections 43 of the bracket member 32 from being pulled back through the towing platform 22. Furthermore, even if a would-be thief removes the nut 19 from the threaded shaft 17, the ball 15 will remain locked within the socket 11 and attached to the towing platform 22 by the coupler locking device 30. The threaded shaft 17 cannot be removed from the towing platform 22 while the bracket member 32 keeps the socket 11 from being removed from the ball 15.

Alternately, an additional measure of protection can be had by use of the plate 31 (not shown) in conjunction with the embodiment of the coupler locking device 30 depicted in FIGS. 6 and 7. Before attaching the chain 52 to the distal fastening sections 43, the plate 31 may be attached with the threaded shaft 17 inserted through the plate shaft hole 37 and the distal fastening sections 43 inserted through the plate arm holes 38. The joining member or chain 52 is then connected to each distal fastening section 43 by inserting S-hook 53 and padlock 40 through the latching hole 51 closest to the lower side of the plate 31. This alternate, though non-essential, use of the plate 31 is effective in deterring removal of the nut 19 from the threaded shaft 17.

In another alternate embodiment of the coupler locking device 30 of FIG. 6, the bumper-type towing platform 22 (shown in FIG. 7) may itself comprise the joining member of the present invention. This alternate embodiment requires the use of two locking devices 40, one attached to each distal fastening section 43 below the towing platform 22 to prevent the bracket member 32 from being removed.

The embodiment of the present invention shown in FIG. 6 also provides effective anti-theft protection when the coupler mechanism 10 is not coupled or hitched to the towing platform 22 of a towing vehicle (not shown). When the coupler mechanism is unhitched, the ball 15 must be removed from the towing platform 22 and inserted into the socket 11. As with the previous embodiment, the washer 18 and an appropriate number of nuts 19 (i.e., enough to leave less than one-half inch of the shaft 17 protruding) are then tightened onto the threaded shaft 17. The shaft 17 is then inserted through the plate shaft hole 37 and the distal fastening sections 43 of the bracket member 32 inserted through the bracket arm holes 38 of the plate 31. Since the trailer (not shown) is not being towed, there is no need to leave any space between the medial guarding section 42 of the bracket member 43 and the top of the socket 11 when connecting the plate 31 to the bracket member 32.

While several embodiments of the present invention have been disclosed, it is to be understood by those skilled in the art that other forms can be adopted, all coming within the spirit of the invention and scope of the appended claims:

I claim:

1. A coupler locking device which can be affixed to a coupler mechanism of a trailer of the type having a socket and a stud-type hitch ball inserted therein, and capable of being releasably affixed to a towing platform of a towing vehicle, said coupler locking device comprising;

(a) a bracket member having a medial guarding section and a plurality of distal fastening sections, said bracket member further comprising at least two bracket arms, each having a proximate mating section, a medial guarding section and a distal fastening section;

(b) at least one joining member for releasably connecting the distal fastening sections of said bracket member so that when the joining member is coupled to said distal fastening sections around the coupler mechanism of a trailer, the stud-type hitch ball inserted in the socket of said coupler mechanism is entrapped therein; and (c) at least one locking device for locking said joining member to said distal fastening sections.

2. A coupler locking device in accordance with claim 1 wherein said joining member comprises a plate having a plate shaft hole and a plurality of bracket arm holes, said bracket armholes sized to receive the longer width of at least one distal fastening section of said bracket arm in only one direction.

3. A coupler locking device in accordance with claim 2 wherein said distal fastening sections further comprise a plurality of symmetrically opposing teeth located on each edge of the distal fastening section, said teeth sized to accommodate said plate when a distal fastening section is inserted into a bracket armhole and engaged in the locking position.

4. A coupler locking device in accordance with claim 3 wherein said proximate mating sections have a hole sized to receive said locking device.

5. A coupler locking device in accordance with claim 3 wherein said proximate mating sections have a plurality of retaining pegs forming a lock notch.

6. A coupler locking device which can be affixed to a coupler mechanism of a trailer of the type having a socket and a stud-type hitch ball inserted therein, and capable of being releasably affixed to a towing platform of a towing vehicle, said coupler locking device comprising:
   (a) bracket member having a medial guarding section and a plurality of distal fastening sections:
   (b) at least one joining member for releasably connecting the distal fasting section of said bracket member so that when the joining member is coupled to said distal fastening section around the coupler mechanism of a trailer and at least a portion of the towing platform, the stud-type hitch ball inserted in the docket of said coupler mechanism and at least a portion of the towing platform are entrapped therein;
   (c) at least one locking device for locking said joining member to said distal fastening sections;
   (d) said distal fastening sections having a plurality of holes sized to receive said locking device; and
   (e) said joining member comprising a chain.

7. A coupler locking device in accordance with claim 6 wherein said chain is connected to one distal fastening section by a hooking device and to at least one other distal fastening section by said locking device.

8. A coupler locking device in accordance with claim 6 wherein said joining member further comprises a plate, said plate having a plate shaft hole and a plurality of bracket arm holes sized to receive at least one distal fastening section of said bracket member.

9. A coupler locking device in accordance with claim 8 wherein said chain is connected to one distal fastening section by a hooking device and to at least one other distal fastening section by said locking device.

10. A method for locking a coupler mechanism of a trailer to a stud-type hitch ball mounted on a towing platform of a towing vehicle, said method comprising:
    (a) coupling a socket of the coupler mechanism to said hitch ball;
    (b) surrounding said coupler mechanism and at least a portion of said towing platform with a bracket member and a joining member such that the ball is prevented from being removed from the socket and the ball is prevented from being removed from the towing platform;
    (c) locking said bracket member to said joining member;
    (d) said surrounding step being performed by;
        (i) attaching said joining member to a threaded shaft of said ball; and
        (ii) fastening said bracket member to said joining member; and
    (e) said fastening step being performed by:
        (i) inserting a first bracket arm into said joining member having a first hole for such insertion;
        (ii) inserting a second bracket arm into said joining member having a second hole for such insertion; and
        (iii) mating said first bracket arm to said second bracket arm.

11. A coupler locking device which can be affixed to a coupler mechanism of a trailer of the type having a socket and a stud-type hitch ball inserted therein, and capable of being releasably affixed to a towing platform of a towing vehicle, said coupler locking device comprising:
    (a) a bracket member having a medial guarding section and a plurality of distal fastening sections;
    (b) at least one joining member for releasably connecting the distal fasting section of said bracket member so that when the joining member is coupled to said distal fastening section around the coupler mechanism of a trailer and at least a portion of the towing platform, the stud-type hitch ball inserted in the docket of said coupler mechanism and at least a portion of the towing platform are entrapped therein;
    (c) at least one locking device for locking said joining member to said distal fastening sections; and
    (d) said joining member comprising a plate, said plate having a plate shaft hole and a bracket arm hole sized to receive at least one distal fastening section of said bracket member.

12. A coupler locking device which can be affixed to a coupler mechanism of a trailer of the type having a socket and a stud-type hitch ball inserted therein, and capable of being releasably affixed to a towing platform of a towing vehicle, said coupler locking device comprising:
    (a) a bracket member having a medial guarding section and a plurality of distal fastening section;
    (b) at least one joining member for releasably connecting the distal fastening sections of said bracket member so that when the joining member is coupled to said distal fastening sections around the coupler mechanism of a trailer and at least a portion of the towing platform, the stud-type hitch ball inserted in the socket of said coupler mechanism and at least a portion of the towing platform are entrapped therein;
    (c) at least one locking device for locking said joining member to said distal fastening sections; and
    (d) said joining member comprising a chain.

13. A coupler locking device in accordance with claim 12 wherein said joining member further comprises a plate, said plate having a plate shaft hole and a plurality of bracket arm holes sized to receive at least one distal fastening section of said bracket member.

14. A coupler locking device in accordance with claim 12 wherein said chain is connected to one distal fastening section by a hooking device and to at least one other distal fastening section by said locking device.

* * * * *